United States Patent [19]
Ball

[11] Patent Number: 5,276,280
[45] Date of Patent: Jan. 4, 1994

[54] ELECTRICAL CABLE CONNECTOR

[76] Inventor: Charles R. Ball, 5422 Wilson Switch Rd., Borden, Ind. 47106

[21] Appl. No.: 876,507

[22] Filed: Apr. 30, 1992

[51] Int. Cl.$^5$ ............................................. H02G 3/18
[52] U.S. Cl. ................................... 174/65 R; 248/56; 285/243; 285/257
[58] Field of Search ..................... 439/449, 460–462; 174/65 R, G, SS; 285/421, 249, 341, 342, 343, 382.7, 216, 217, 243, 257; 248/56; 24/136; 403/368–371, 374, 409.1

[56] References Cited

U.S. PATENT DOCUMENTS

| | | | |
|---|---|---|---|
| 1,797,194 | 3/1931 | Knapp | 403/370 |
| 1,835,155 | 12/1931 | Harbert | 248/56 |
| 2,057,645 | 10/1936 | Hamilton | 285/217 |
| 2,828,147 | 3/1958 | Peiffer | 285/421 |
| 3,300,163 | 1/1967 | Randolph | 174/65.6 |
| 3,788,582 | 1/1974 | Swanquist | 248/56 |
| 4,180,227 | 12/1979 | Gretz | 248/56 |
| 4,190,222 | 2/1980 | Appleton et al. | 248/56 |
| 4,299,363 | 11/1981 | Datschefski | 248/56 |
| 4,494,779 | 1/1985 | Neff et al. | 285/159 |
| 4,549,037 | 10/1985 | Bawa et al. | 174/65 |
| 4,711,974 | 12/1987 | Borsh | 174/65 |
| 4,794,490 | 12/1988 | Epstein | 361/428 |
| 4,808,774 | 2/1989 | Crane | 174/135 |
| 4,880,387 | 11/1989 | Stikeleather et al. | 439/98 |

FOREIGN PATENT DOCUMENTS 2747541  4/1979  Fed. Rep. of Germany ...... 403/371

*Primary Examiner*—Neil Abrams
*Attorney, Agent, or Firm*—Camoriano & Smith

[57] ABSTRACT

A connector for electrical cable includes a tubular receptacle member and a wire-gripping member which mate with a wedge-fit so that the wire-gripping member squeezes down tighter on the electrical cable as it is pushed farther into the receptacle. The wire-gripping member includes wire gripping legs. The wire-gripping member is assembled together with the receptacle by inserting it through discontinuities in the receptacle, rotating it a few degrees, and then pushing it axially into the receptacle.

7 Claims, 2 Drawing Sheets

ELECTRICAL CABLE CONNECTOR

BACKGROUND OF THE INVENTION

The present invention relates to electrical connectors, and, in particular, to electrical connectors for receiving and gripping electrical cable in a knock-out opening of an electrical box.

Some electrical connectors are known for receiving and gripping electrical cable, but these connectors require the use of a tool in order to make the connector grip the cable. These connectors are also made so as to accept only a single size of cable, so that it is necessary to stock several different sizes of connectors in order to be able to work with different cable sizes.

SUMMARY OF THE INVENTION

The present invention provides an electrical connector which can handle a wide range of cable sizes and numbers of cable strands and which can be installed completely by hand, requiring no tools for installation.

DESCRIPTION OF THE PREFERRED EMBODIMENT

Figure 1:
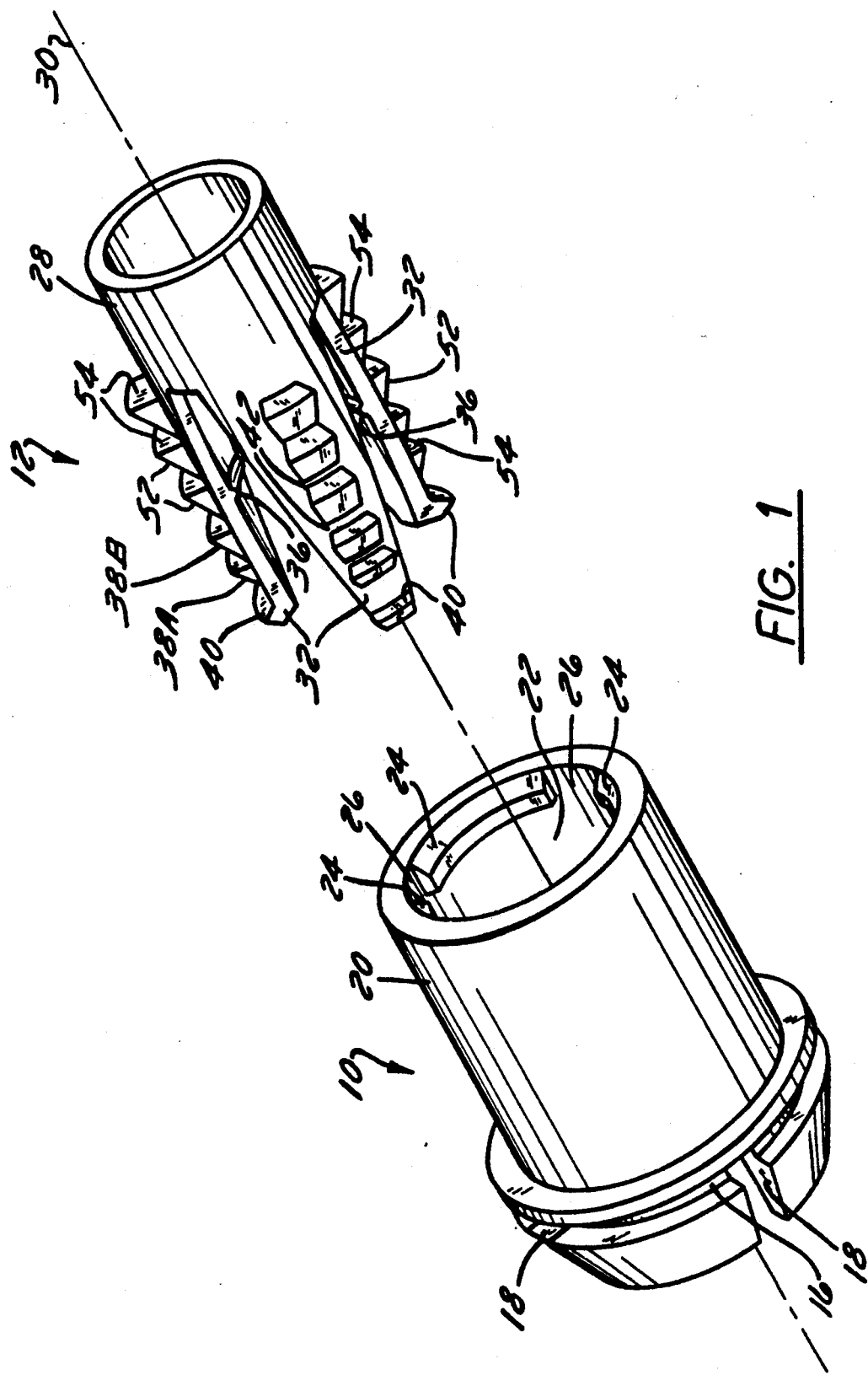
FIG. 1 is a perspective view, showing the two pieces of the electrical connector of the present invention before they are put together.
Figure 2:
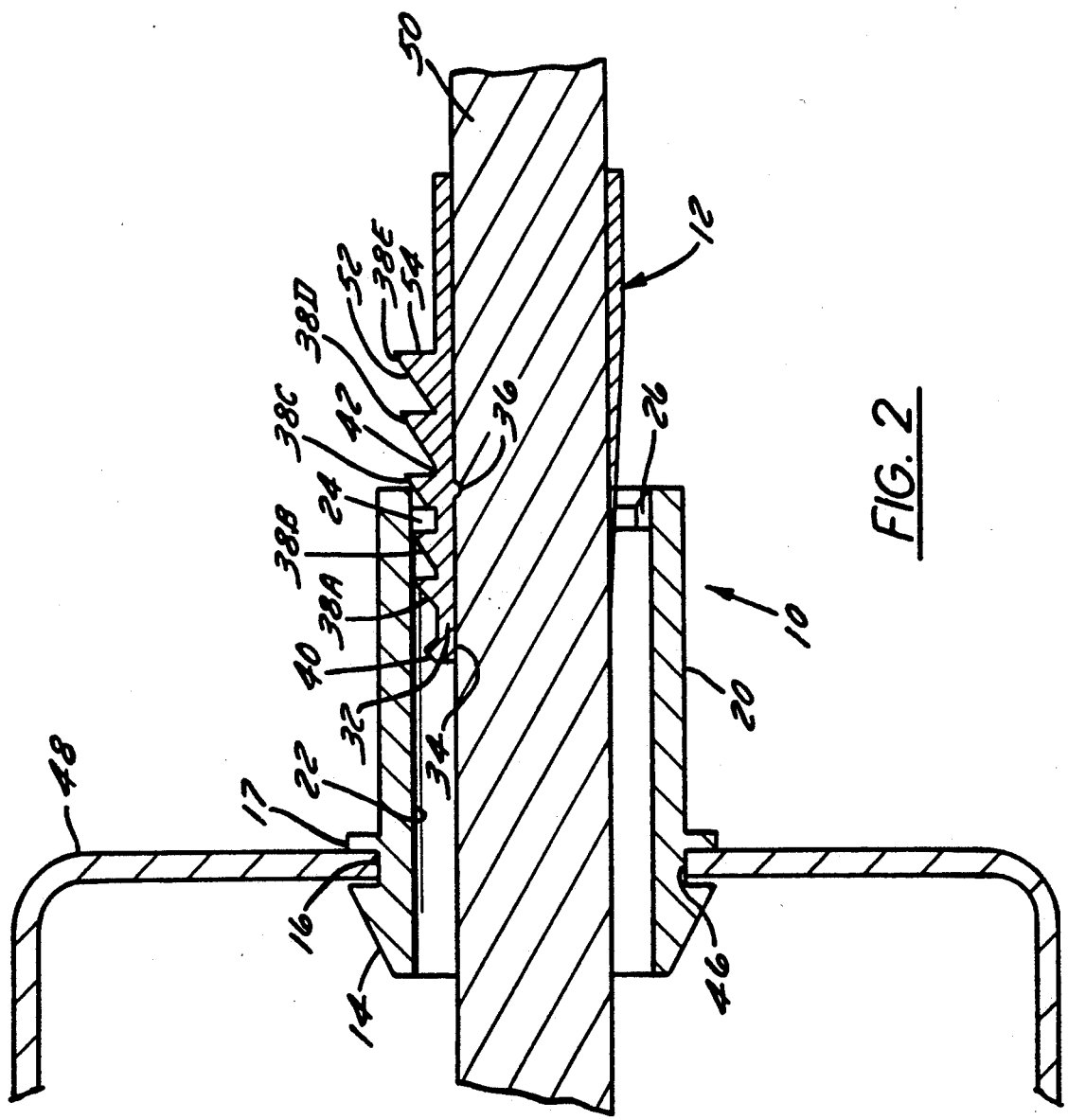
FIG. 2 is a side sectional view showing the electrical connector of FIG. 1 installed in the knockout hole of an electrical box and gripping an electrical cable.

As shown in FIGS. 1 and 2, the preferred embodiment of the electrical connector of the present invention is made up of two parts—the receptacle 10 and the wire-gripping member 12.

The receptacle 10 is essentially tubular in shape, except that it has a tapered outer surface 14 at its front end, which terminates in an annular recess 16. The back of the annular recess 16 is defined by an annular collar 17. The front end portion of the receptacle 10 has three equally-spaced gaps 18 (two of which are shown in FIG. 1), which permit the front end of the receptacle to collapse inwardly as the receptacle is pushed into the knockout hole of the electrical box. When the annular recess 16 reaches the knockout hole, the front end of the receptacle then springs back to its normal shape, retaining the receptacle on the electrical box.

Except for the tapered surface 14, the annular recess 16, the collar 17, and the gaps 18, the outer surface 20 of the receptacle 10 is cylindrical. The receptacle 10 and the wire-gripping member 12 are preferably molded of a polymer material, giving them the material properties required for flexing and then springing back into shape.

The inner surface 22 of the receptacle 10 is also cylindrical, except that, near its back end there are three inwardly-projecting ridges 24, designed to retain the wire-gripping member 12 on the receptacle 10. The ridges 24 have gaps 26 between them, which permits the wire-gripping member 12 to enter the receptacle through the gaps without deforming, to be rotated a few degrees, and then to be retained by the ridges 24. Preferably, one of the legs of the wire-gripping member makes a larger arc than the other legs (i.e. encompasses a greater portion of the circle, perhaps fifteen degrees, while the other legs may encompass only ten degrees), and only one of the gaps 26 is wide enough to permit that large leg to pass through, so the wire-gripping member and the receptacle must be rotated to a precise location in order for them to be separated (this avoids loss of the parts).

The wire-gripping member 12 includes an annular portion 28, which defines an axis 30, and three wire-gripping legs 32, which project forward from the annular portion in a direction parallel to the axis 30. The inner surface 34 of the gripping member 12 is cylindrical, except for the gaps between the legs 32 and except for the inwardly-projecting ridge 36 located midway along each leg 32 for gripping the cable.

The outer surfaces of the wire-gripping legs 32 are made up of a series of wedge-shaped teeth 38, with the outside diameter of each tooth increasing from front to back, and with each successive tooth having a progressively larger maximum diameter moving from front to back, thereby providing a tapered outer surface which causes the legs 32 to tighten more and more on the electrical cable as the wire-gripping member 12 is pushed farther into the receptacle 10. For example, the first tooth 38A has a smaller maximum outside diameter than does the second tooth 38B, and so forth. The respective teeth 38A, 38B, 38C and so forth on one leg have the same respective outside diameters and are in the same axial positions as the respective teeth 38A, 38B, 38C and so forth on the other two legs. On each leg 32, forward of the first tooth 38A, is a retaining projection 40, the sole purpose of which is to retain the wire-gripping member 12 on the receptacle 10 when the connector is not in use, as was described earlier.

There is a space or gap 42 between the teeth 38A, 38B, and so forth, and the length of that space 42 corresponds to the length of the ridge 24, so that the ridge 24 can fit between the teeth 38 and can serve to lock the gripping member 12 in place once it has been installed, as shown in FIG. 2.

Installation of a cable in a box using the electrical connector of the present invention is as follows:

First, the receptacle 10 is pushed forward by hand into the knock-out hole 46 of the electrical box 48. The forwardmost portion of the tapered outer surface 14 is small enough to enter the knock-out hole 46 without deforming, and then, as the receptacle 10 is pushed forward, the force of the box 48 on the tapered surface 14 causes the front of the receptacle 10 to collapse inwardly (partially closing the gaps 18) in order to pass through the knock-out hole 46, until the annular recess 16 reaches the knock-out hole 46, at which point the receptacle 10 springs back to its original shape, holding itself in place on the box, with the box fixed in position between the tapered front portion 14 of the receptacle 10 and the collar 17.

Next, the cable or wires 50 are passed by hand through the receptacle and through the wire-gripping member 12. Then, the legs 32 of the wire-gripping member are aligned with their respective gaps 26 in the receptacle 10, and the wire-gripping member 12 is pushed forward by hand into the receptacle 10. The tapered, ramplike outer surfaces 52 of the teeth 38A, 38B, 38C contact the inner surface 22 of the receptacle 10 as the wire-gripping member 12 enters the receptacle 10, and, since the outside dimension of the teeth 38 increases from one tooth to the next, the legs 32 are pressed together more and more as the wire-gripping member is pushed into the receptacle. When the legs 32 are pressed together enough to grip the cable or cables 50 tightly, with the ridges 36 of the legs pressing into the cable 50 and slightly deforming the surface of the cable 50 to get a good grip, then the wire-gripping member 12 is rotated a few degrees, so the retaining ridges 24 of the receptacle 10 catch on the back surfaces 54 of their respective teeth 38, holding the wire-gripping member in place, and retaining the wire 50 in the knockout hole 46 of the box 48.

It should be noted that the entire installation is conducted completely by hand, and a single size of electrical connector of the present invention can be used for a wide range of cable sizes (i.e. from a number 14 wire to a number 10 wire) as well as for one, two, or a few strands of wire in each connector.

It will be obvious to those skilled in the art that modifications may be made to the embodiment described above without departing from the scope of the present invention.

What is claimed is:

1. An electrical cable connector, comprising:
    a tubular receptacle member, defining a forward end, a back end, an inner surface, and an outer surface which is adapted to be received in a knock-out hole of an electrical box;
    a wire-gripping member, including:
        an annular member, defining an axis; and
        a plurality of wire-gripping legs projecting forward from said annular member parallel to its axis, said wire-gripping legs being received in said inner surface of said receptacle member with a wedge fit, such that, when the legs of said wire-gripping member are inserted into said receptacle member, said wire-gripping legs are pushed inwardly, toward the axis,
    wherein said receptacle defines a smaller-diameter ridge near the back end of its inner surface for retaining the wire-gripping member, and said smaller-diameter ridge defines discontinuities located so that said wire-gripping legs can enter the receptacle through said discontinuities, be rotated a few degrees, and then be retained on said receptacle, and so that said wire-gripping member can readily be released from said receptacle by rotating it a few degrees, so said wire-gripping legs can leave the receptacle through said discontinuities.

2. An electrical cable connector as recited in claim 1, wherein said tubular receptacle member defines a tapered outer surface portion at its forward end, terminating in an annular recess, sized to be received in a knock-out hole of an electrical box.

3. An electrical cable connector as recited in claim 1, wherein said wire-gripping legs define at least one inwardly-projecting rib on their inner surfaces for gripping a wire.

4. An electrical cable connector as recited in claim 1, wherein the outer surface of said wire-gripping legs defines a plurality of wedge-teeth, with the largest outside dimension of the wedge-teeth increasing from the front end of said legs toward the back, so that said wire-gripping legs collapse together more and more as the wire-gripping member is pushed farther axially into said receptacle, permitting said connector to grip several different sizes and shapes of wire and various numbers of wire strands.

5. An electrical cable connector, comprising:
    a tubular receptacle member, defining a forward end, a back end, an inner surface, and an outer surface which is adapted to be received in a knock-out hole of an electrical box; and
    a wire-gripping member, including:
        an annular member, defining an axis; and
        a plurality of wire-gripping legs projecting forward from said annular member parallel to its axis, said wire-gripping legs being received in said inner surface of said receptacle member with a wedge fit, such that, when the legs of said wire-gripping member are pushed axially into said receptacle member, said wire-gripping legs are pushed axially into said receptacle member, said wire-gripping legs are pushed inwardly, toward the axis, wherein the outer surface of said wire-gripping legs defines a plurality of wedge-teeth, with the largest outside dimension of the wedge-teeth increasing from the front end of said legs toward the back, so that said wire-gripping legs collapse together more and more as the wire-gripping member is pushed farther into said receptacle, permitting said connector to grip several different sizes of wire and various numbers of wire strands.

6. An electrical cable connector as recited in claim 5, wherein said connector can grip a wide range of wire sizes, from number 14 wire to number 10 wire.

7. An electrical cable connector as recited in claim 5, and further comprising an inwardly-projecting retaining ridge on the inner surface of said receptacle member, said retaining ridge having a length, and wherein said wire-gripping legs define spaces between said wedge-teeth, said spaces having a length substantially equal to the length of said retaining ridge so that said retaining ridge will fit between two of said teeth for retaining the wire-gripping legs in place.

* * * * *